United States Patent [19]

Low

[11] Patent Number: 5,138,952

[45] Date of Patent: Aug. 18, 1992

[54] TRANSIT SYSTEM FOR ROADS AND GUIDEWAY WITH PIVOTAL ARM MOUNTED TRACTION WHEEL FOR ENGAGEMENT OF UNDERSURFACE OF GUIDEWAY

[76] Inventor: R. Glen Low, 1911 Meadowview Rd., Minneapolis, Minn. 55420

[21] Appl. No.: 763,442

[22] Filed: Sep. 19, 1991

[51] Int. Cl.⁵ .................. B61C 11/00; E01B 25/00
[52] U.S. Cl. .................. 105/72.2; 104/130; 104/139
[58] Field of Search .............. 105/72.2, 215.2; 104/130, 139, 140, 146; 180/2.1

[56] References Cited

U.S. PATENT DOCUMENTS

| | | | |
|---|---|---|---|
| 3,254,608 | 6/1966 | Aldem | 104/130 X |
| 3,643,601 | 2/1972 | Taylor et al. | 104/119 X |
| 3,780,666 | 12/1973 | Perrott | 104/130 X |
| 3,782,292 | 1/1974 | Metcalf | 104/130 |
| 3,841,225 | 10/1974 | Johnson | 104/130 |
| 3,845,719 | 11/1974 | Langdon | 104/130 |
| 3,874,299 | 4/1975 | Silva et al. | 104/130.1 |
| 3,913,491 | 10/1975 | Aver et al. | 104/130 |
| 4,000,700 | 1/1977 | Hannover et al. | 104/130 |
| 4,213,396 | 7/1980 | Mehren et al. | 104/130 |
| 4,326,465 | 4/1982 | Forrest | 104/140 X |
| 4,671,185 | 6/1987 | Anderson et al. | 104/130 |

FOREIGN PATENT DOCUMENTS 0120116 9/1979 Japan .................. 104/140

Primary Examiner—Robert J. Oberleitner
Assistant Examiner—S. Joseph Morano
Attorney, Agent, or Firm—Lawrence M. Nawrocki

[57] ABSTRACT

A transit system employing multiple modes of operation. The system includes a guideway having a portion over which a vehicle traverses from one location to another, the traverse portion having a longitudinally-extending slot formed generally centrally therewithin. The guideway also includes an entry ramp which directs a traction drive wheel stem to centrally position the vehicle on the guideway. The system also includes a vehicle which is configured for travel over both a roadway and the guideway. The vehicle includes a chassis supported by a plurality of motive wheels. The chassis mounts a stem for pivoting between an upper, retracted position and a lower, extended position. The stem mounts, at its lower end, a traction drive wheel which engages an undersurface of the guideway to accomplish movement of the vehicle during the guideway mode of operation. Means are provided for both driving the motive wheels, during the roadway mode of operation, and the traction drive wheel, during the guideway mode of operation. An on-board computer controls guidance of the vehicle over the guideway system.

15 Claims, 7 Drawing Sheets

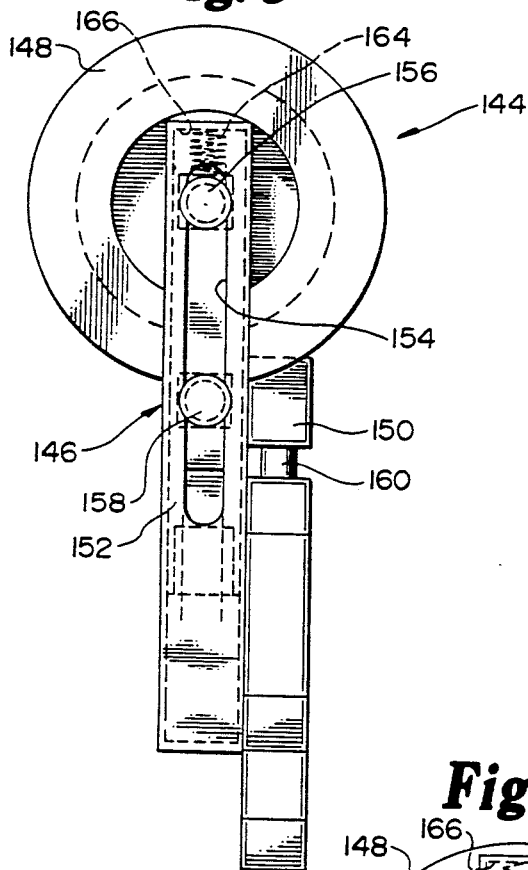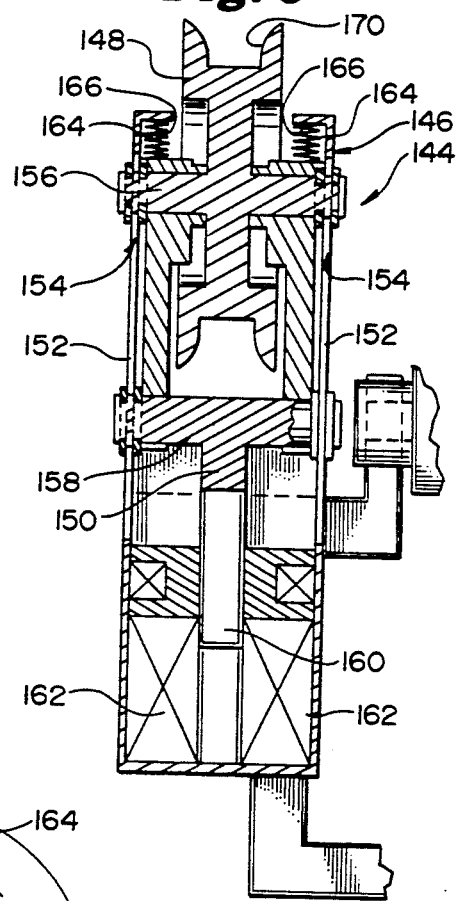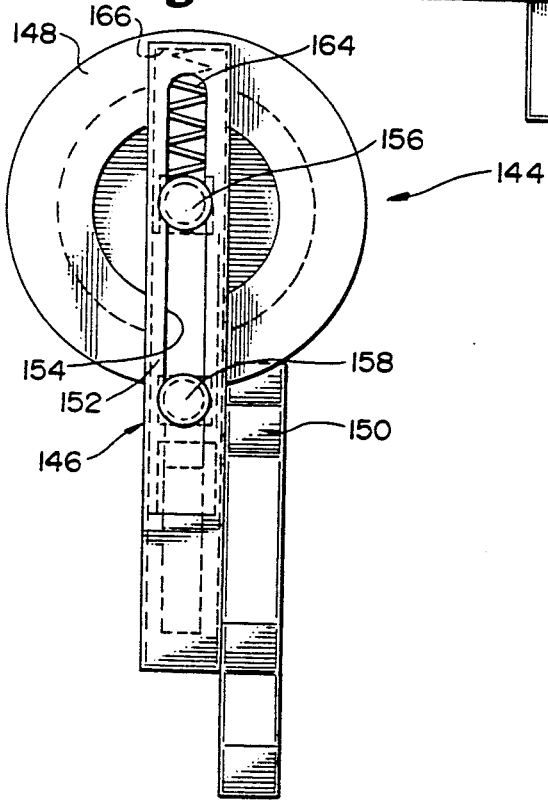

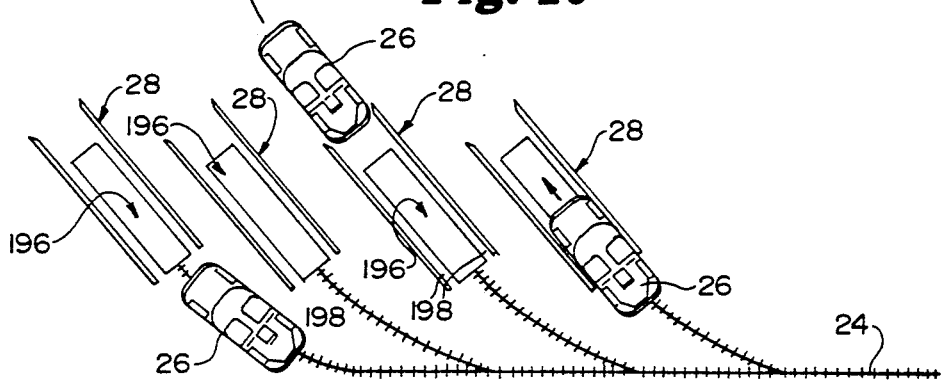
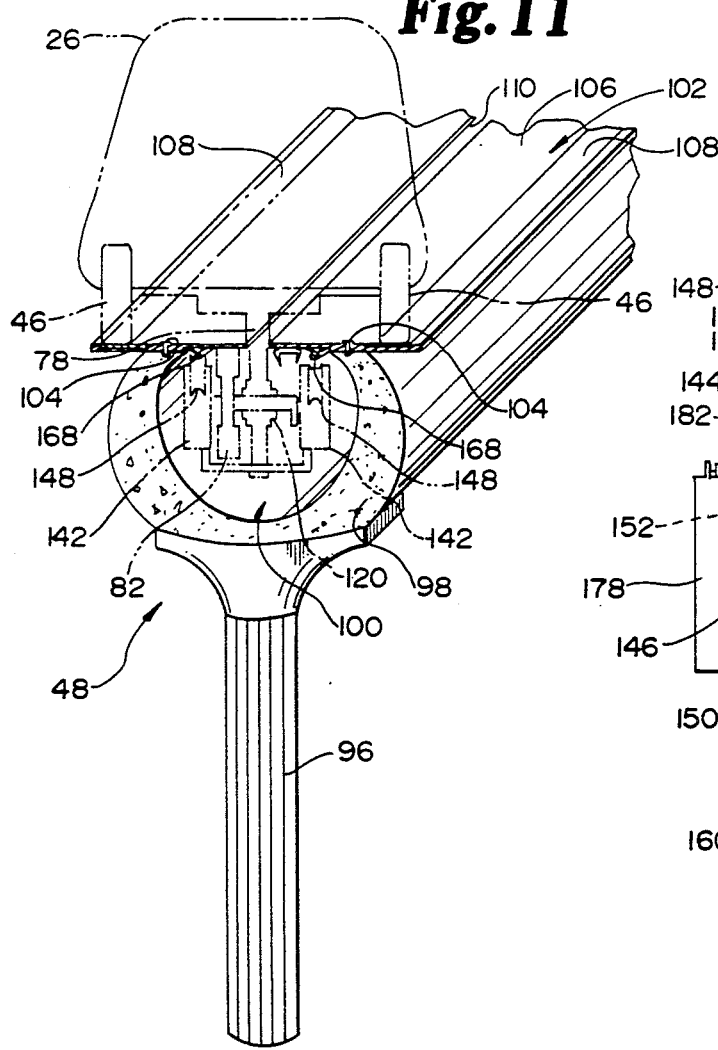
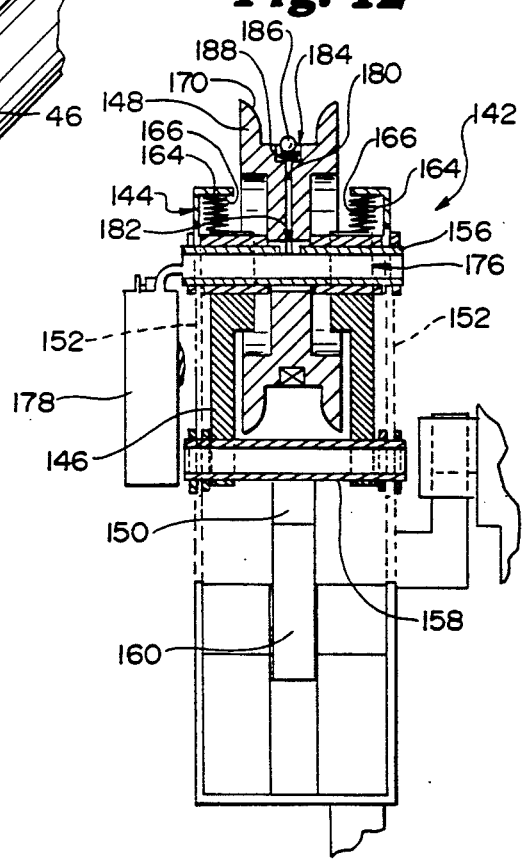

TRANSIT SYSTEM FOR ROADS AND GUIDEWAY WITH PIVOTAL ARM MOUNTED TRACTION WHEEL FOR ENGAGEMENT OF UNDERSURFACE OF GUIDEWAY

TECHNICAL FIELD

The present invention deals broadly with the field of transportation. More narrowly, however, the invention is related to a metropolitan area transit system using small vehicles. The specific focus of the invention is a dual mode electric vehicle which travels on either a guideway under on-board computer control, using utility company supplied power, or on city streets other than freeways and automobile thoroughfares, using battery power and under control of a vehicle occupant. The preferred embodiment of the invention includes such a vehicle which incorporates a traction and on-board switching mechanism for use in propelling and directing the vehicle when in the guideway mode of operation.

BACKGROUND OF THE INVENTION

Anyone traveling in metropolitan traffic today is painfully aware of the automobile congestion which turns a twelve-minute commute into forty-five minutes or more of breathing the foul air that is responsible for more than one-half million unnecessary American deaths each year and billions of hours of lost production time.

In the United States today, ninety-eight percent (98%) of those trips are made by gasoline-powered private automobiles. They alone are responsible for more than forty percent (40%) of urban air pollution.

Various plans and programs have been put forth to solve these twin problems, the most prominent of which is increasing mass transit ridership. Taking as an example, a metropolitan area of two million inhabitants, any new or expanded mass transit system which could handle three to five million of the seven million person trips made each day in a timely, economical and non-polluting manner would solve both problems—just as long as the people would utilize the system.

Unfortunately, that is apparently not possible. The primary and most important reason is that traveling by transit is not as "convenient" as traveling in one's own automobile. Today, less than two percent (2%) of the population rides mass transit and even the most ardent supporters of "'born-again' 19th Century streetcars" (a.k.a. light rail) predict no more than a fifty percent (50%) increase in ridership following installation of a new system. The futility of such an approach is proved by the fact that a fifty percent (50%) increase in ridership still leaves ninety-seven percent (97%) of the travelers driving their own gasoline-powered automobiles!

The introduction of a modicum of full-sized electric automobiles in the years ahead, as required by recent California legislation, will further congest traffic by adding more vehicles and may actually result in increasing air pollution. The imposition of more restrictive automobile fuel efficiency standards may help reduce pollution, but we are told that ninety-eight percent (98%) of what can be achieved in this area has already been accomplished.

The only solution other than the imposition of new regulations which would tell citizens when to drive and where to live—is to create a new type of mass transit system, one which uses no fossil fuel and provides the same or greater convenience in metropolitan areas as the privately owned gasoline powered automobile. The creation and the economy of building and operating such a system is facilitated by the fact that seventy-five percent (75%) of all automobiles driven in city traffic today carry only one person.

It is to these problems and dictates of the prior art that the present invention is directed. It is a transit system for use in an urban environment which serves not only to reduce dependence upon foreign oil and to limit air pollution, but it also reduces traffic congestion and provides an environment in which a commuter can work. It is anticipated that this all will be accomplished at a modest cost for installation and operation.

SUMMARY OF THE INVENTION

The present invention is a transit system which enables multiple mode operation. The system includes a guideway which is used in one mode of operation. The guideway includes a traverse portion which has a longitudinally-extending slot formed generally centrally therewithin. The guideway also includes an entry ramp having a cleft formed therein. The cleft narrows from a beginning end of the ramp into the slot formed in the traverse portion at a terminal end of the entry ramp. The system also includes a vehicle which rides on the guideway in the guideway mode of operation. The vehicle includes a chassis which is supported by a plurality of motive wheels. The chassis carries a traction drive wheel which is disposed for movement between a retracted position and an extended position. In the extended position of the traction drive wheel, the drive wheel is in engagement with a lower surface of the traverse portion of the guideway when the vehicle is in position on the traverse portion for guideway mode operations. In the retracted position, the traction drive wheel is disposed above a plane defined by lower extremities of the motive wheels. As a result, when the vehicle is in a roadway mode of operation, the traction drive wheel will not obstruct movement which is accomplished by employment of the motive wheels. Means are provided for driving both the motive wheels and the traction drive wheel.

In the preferred embodiment, attachment of the traction drive wheel to the vehicle chassis is accomplished by means of a stem. The stem is pivotally mounted by an upper, or first, end to the undercarriage of the chassis. The stem mounts, at its second, or lower, end, the traction drive wheel.

In the preferred embodiment also, means are provided for guiding and switching the vehicle along a guideway system when the vehicle is in its guideway mode of operation. In its most basic form, the traverse portion of the guideway could be a straight path between two points. More typically, however, the invention would employ a system wherein the traverse portion of the guideway would have multiple branches. In order to implement selection of a particular branch at a fork or intersection of multiple branches, each branch can be provided with a pair of rails on the underside thereof. The rails would extend downwardly and be spaced laterally, at equal distances, from the generally centrally disposed slot. In the preferred embodiment, the downwardly pivotable stem can be structured so as to carry, in addition to the traction drive wheel, a pair of laterally spaced shieves. Each shieve would be positioned so as to be immediately below a corresponding rail on the undersurface of a guideway branch and one shieve will always capture the guiderail above it as directed by the system computer. The shieve mounting means would including biasing so that, during normal movement of the vehicle along the guideway branch, the shieves, unless instructed otherwise by the on-board system computer, would be retracted downwardly away from the guideway branch's undersurface. The computer, however, having been programmed to guide the vehicle from one location to another, and being aware of the various branches the vehicle will encounter during its transit, would instruct one of the shieves (the one on the side of the vehicle in which a turn is intended) to extend upwardly by appropriate means, such as a solenoid, to capture the corresponding rail within an annular recess in the outer surface of the shieve. This shieve will be maintained in the upwardly extended position by the on-board computer at least until the vehicle enters and passes the fork at which a branch decision must be made. If the next fork requires the selection of the same branch, that particular shieve will continue to be maintained in an upwardly extended position wherein its corresponding rail is captured within its annular recess. If, at the next intersection, the opposite branch is to be selected at a fork, the computer will allow the shieve to be retracted downwardly, and the other shieve will be extended to capture its corresponding rail until the fork is passed.

As one can imagine, heat can be generated at the interface between the rail and the shieve which is in engagement therewith. Consequently, the invention envisions the provision of means for lubricating the interfaces between the shieves and their corresponding rails. In the preferred embodiment, such means can take the form of a radially-extending passage formed in each shieve. It will be understood that, if desirable, multiple radially-extending passages could be provided in each shieve. The inner ends of the passages communicate with a pressurized source of lubricating fluid. An outer end of each passage is provided with a check valve. Typically, the check valve would be of the "ball" type, the ball extending slightly outwardly from the bottom of the annular recess in the shieve. The ball would be biased to this outwardly extending position. As a shieve rotates while in engagement with its corresponding rail, the ball detent would be depressed to overcome the outward bias. Such depression would, in turn, allow an amount of lubricating fluid to be metered through the passage or passages to effect lubrication of the interface.

It is contemplated that a common motor would be employed for driving the motive wheels and the traction drive wheel. In order to overcome problems of air pollution, an electric motor is envisioned for this purpose. The motive wheels would, of course, be employed for effecting movement of the vehicle during roadway mode of operation, and the traction drive wheel would effect movement of the vehicle along the guideway during guideway mode of operation.

While the invention certainly includes manual, volitional implementation of commands, it is anticipated that on-board computer control would most often be used. Computer control means are, therefore, intended to be provided. Such control means would function, for example, to implement guideway branch selection as a vehicle approaches an intersection or fork. A passenger in a vehicle riding in guideway mode of operations could program the computer fully to direct the vehicle from an initial location to an ultimate destination. The computer, knowing the layout of the guideway system, could automatically effect shieve extension to accomplish transition from one branch to another. Again, transition could be effected by solenoid actuation to accomplish extension of the shieve.

In a large-scale system, it is envisioned that vehicles would be rather small (typically, two person capacity). If a larger group would be traveling together, a plurality of vehicles, it is intended, could be coupled together. The lead vehicle in the ganged-together assembly would be programmed for transit path, and the "towed" vehicle would be slaved to the lead vehicle so that both vehicles would travel together As will be able to be seen then, in view of this disclosure, a large-scale transit system can be assembled incorporating the principles of the present invention. A multiplicity of vehicles could be in use in both guideway and roadway modes of operation. The transition from roadway to guideway mode of operation could be easily accomplished by employment of an entry ramp as previously discussed. Similarly, an exit ramp could be employed to effect transition from guideway to roadway mode of operation.

It is intended that the stem of each vehicle carry a pair of collectors which would be in engagement with two lines mounted along each guideway branch. The collectors would function to pick up communications from the guideway system and to obtain power therefrom to actuate the electric motor.

The present invention is thus an improved transit system which goes far toward solving many of the problems of the prior art and implementing desirable features dictated thereby. More specific features and advantages obtained in view of those features will become apparent with reference to the DETAILED DESCRIPTION OF THE INVENTION, appended claims, and accompanying drawing figures.

BRIEF DESCRIPTION OF THE DRAWINGS

FIG. 5 is a simplified mechanical detailed view of the structure illustrated in FIG. 4;

FIG. 6 is a simplified fragmentary mechanical detailed view of the structure illustrated in FIG. 4;

FIG. 7 is a view similar to FIG. 5 showing parts in a secondary position;

FIG. 10 is a simplified fragmentary top plan view showing multiple exit ramps from a guideway system;

FIG. 11 is a simplified fragmentary pictorial view of an elevated guideway portion of the system in which a phantom transverse planar layout of a vehicle is shown; and FIG. 12 is a view similar to FIG. 6 showing an embodiment of certain structure different from that illustrated in FIG. 6.

DETAILED DESCRIPTION OF THE INVENTION

Figure 8:
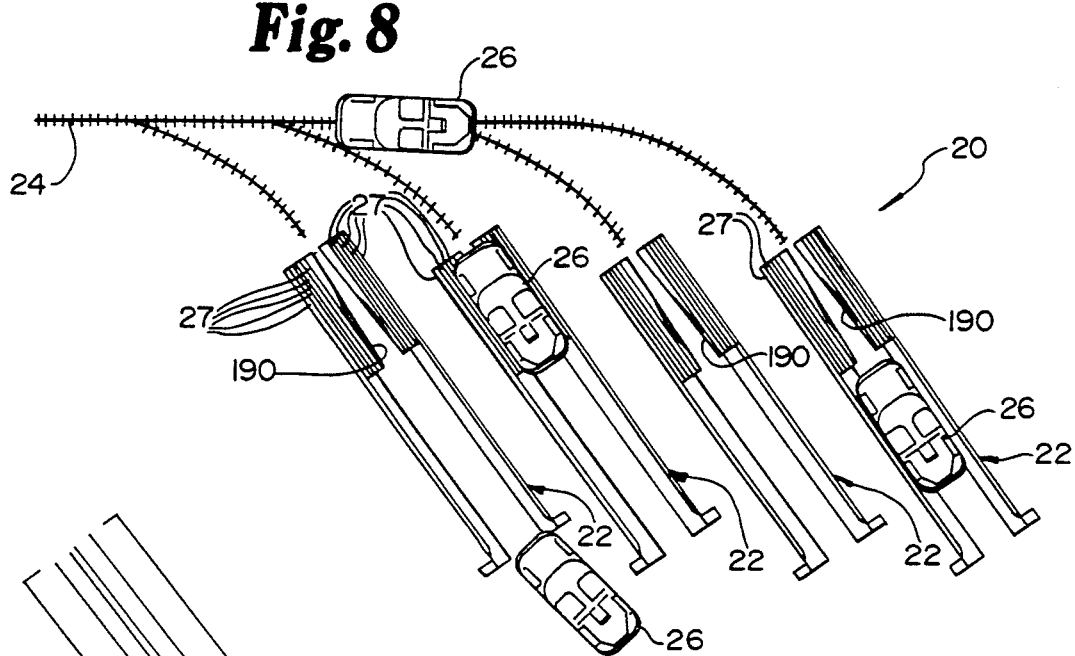
FIG. 8 is a simplified fragmentary top plan view showing multiple entry ramps intersecting with a guideway branch and vehicles being inserted for guideway mode operations.

Referring now to the drawings wherein like reference numerals denote like elements throughout the several views, FIGS. 8-11, illustrate, broadly, a transit system in accordance with the present invention. FIG. 8 illustrates an entrance station 20 configuration to a guideway mode of operations guideway system. Plural entry ramps 22 are illustrated (in this case four), and each entry ramp 22 merges with a branch 24 of the overall guideway system. While in FIG. 8 it appears that a branch of the guideway system is only starting at this particular station, it will be understood that entry ramps 22 can, and do, frequently merge with guideway branches at points along the length of a branch. Therefore, the branch segment onto which one vehicle has entered, might have started at another location and merely be continuing through this station.

As previously indicated, FIG. 8 illustrates a plurality of entry ramps 22. Implicit in this fact is a number of things. First of all, it implies that vehicles 26 used in the overall transit system are intended for non-guideway transport also. This is, in fact, the case. Roadway operations are also intended for vehicles 26 used in the system. The invention in accordance with this document is specifically intended to provide for dual modes of operation.

Also implicit in the multiple entry ramps 22 is the fact that many vehicles 26 might, at any particular time, need to enter the guideway system at a particular station. This is also, in fact, true. It would particularly be the case during rush hours (for example, at a time when many people are getting out of work). The multiple ramps 22, therefore, allow for more expedited entry to the guideway system.

FIG. 8 illustrates a vehicle 26 having entered a primary branch 24 of the guideway system from the entry ramp 22 second from the right. At the same time, another vehicle 26 is about to enter the guideway branch 24 from the ramp 22 second from the left. The rightmost ramp 22 has a vehicle 26 just starting to move up that ramp 22, and the leftmost ramp 22 illustrates a vehicle 26 about to enter onto the ramp 22. As will be able to be seen then, a plethora of vehicles 26 can be processed per unit of time.

Figure 9:
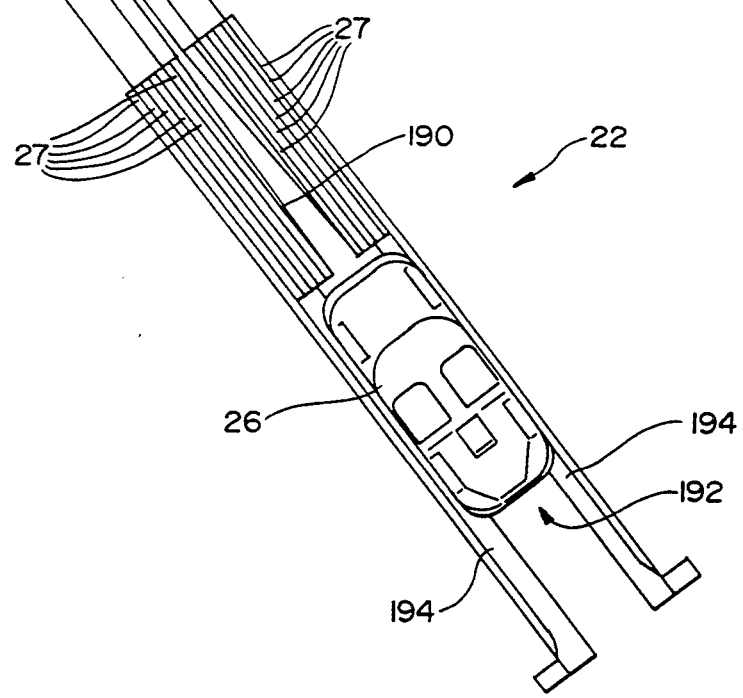
FIG. 9 is a fragmentary top plan detailed view of a single entry ramp.

FIG. 8 illustrates the construction of the entry ramps 22 in small scale. FIG. 9 illustrates the construction on a larger scale, and that construction will be discussed in more detail hereinafter.

While FIG. 8 and FIG. 9 illustrate the transition a vehicle 26 makes from a roadway mode to a guideway mode by means, in part, of centering rollers 27, FIG. 10 illustrates the transition from the guideway mode back to the roadway mode. FIG. 10 illustrates construction of an exit ramp 28. Again, the construction will be discussed in more detail with regard to the operation of the overall system.

Figure 1:
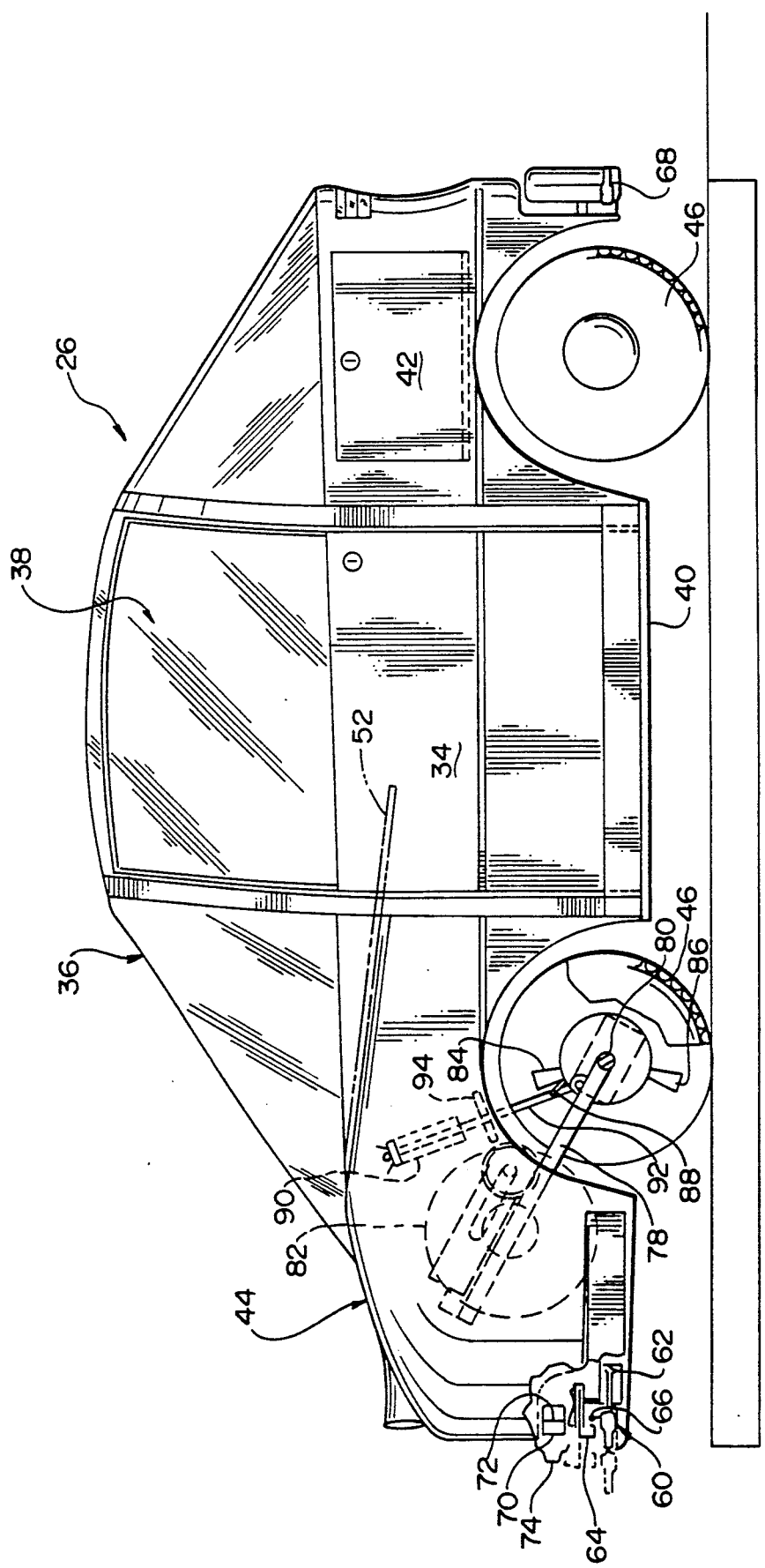
FIG. 1 is a simplified left-side elevational view of a vehicle in accordance with the present invention as configured for roadway mode operations.

FIG. 1 illustrates a vehicle 26 used in the transit system. The vehicle 26 is normally intended to accommodate two passengers, one in a right seat 30, and a second in a left seat 32. Ingress to, and egress from, the vehicle 26 are provided through a pair of laterally sliding doors 34, one on either side of the vehicle 26. A seat can also provide for a small child.

It is intended that a vehicle 26 be able to be configured for entry of wheelchairs, and means (not shown) can be provided for retracting one or more of the seats 30, 32 (seen best in FIG. 2) normally included, and securing a wheelchair in place within the passenger compartment 38. While, typically, the floor of the passenger compartment 38 of the vehicle 26 would be elevated with respect to the loading station, easy loading of the wheelchair could be accomplished by means of optional side ramps 40 to the vehicle 26. The side ramps 40 could be pivoted upwardly or retracted when the vehicle 26 is in transit. For loading, they would, of course, be pivoted downwardly.

FIG. 1 also illustrates a vehicle 26 having the capability of transporting baggage, boxes, and/or other passenger cargo. FIG. 1 illustrates a door 42 which affords entry to a storage compartment. The body 44 of the vehicle 26 is mounted to a plurality of wheels 46 which enable the vehicle 26 to move over a road during the roadway mode of operation and support the vehicle 26 on a guideway 48 during the guideway mode of operation. The figure illustrates four of such wheels 46, although this number is certainly not exclusive. It is intended that these motive wheels 46 comprise pneumatic tires having a core of hard rubber in the center. Such a core would be sufficiently large in order to provide a minimal necessary support in the event of a flat.

Figure 2:
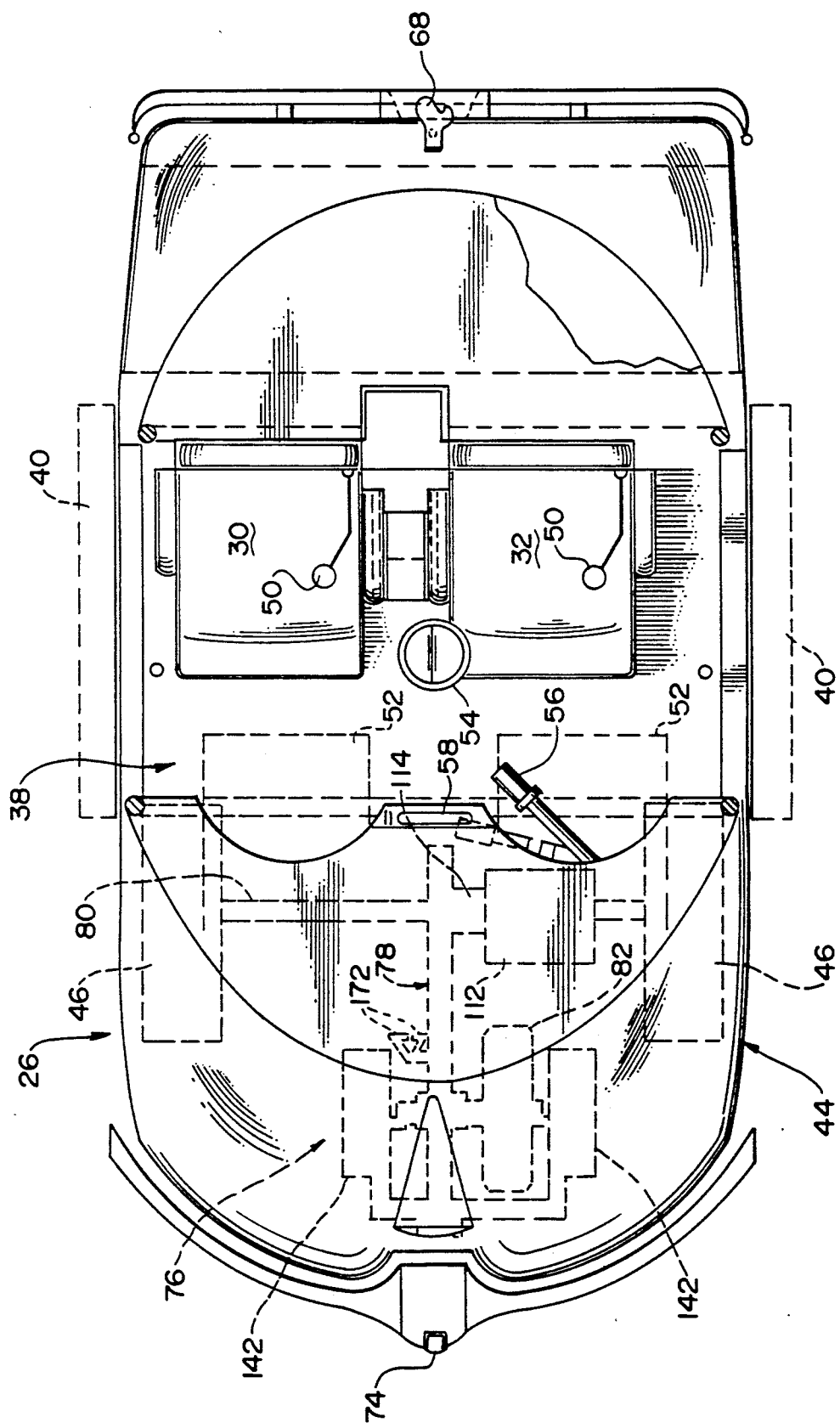
FIG. 2 is a simplified top plan view of the vehicle of FIG. 1.

FIGS. 1 and 2 also illustrate various fixtures which could be employed in the vehicle 26. For example, reading lights 50 could be provided for night travel during the guideway mode of operation. As will be seen hereinafter, in this mode, no vigilance or operation is necessary on the part of the passengers, so reading or other work could be accomplished. The reading lights 50 facilitate such activity.

FIGS. 1 and 2 also illustrate the provision of work surfaces 52. These can be either fixed, retractable, or removable, and they would be presented, when configured for use, in an accessible location. It is intended, however, that work surfaces 52 be automatically extended when the vehicle 26 is in guideway operation and automatically retracted when in roadway operation.

FIG. 2 also illustrates a tiller 56. The tiller 56 is illustrated as being in position at a location at which a steering wheel in a conventional internal combustion engine automobile is located. The tiller 56 enables the left passenger to "steer" the vehicle 26 during roadway mode operations, and tiller 56 can incorporate speed and braking controls.

FIG. 2 also illustrates an instrument panel 58. Such a panel 58 can serve a number of functions. Among these functions is the inputting to a computer (not shown) of information with respect to intended destination station. It will be understood that, in the guideway mode of operation, the vehicle 26 functions automatically once the information is inputted to the computer, and, as a result, the passengers are freed-up to participate in other tasks.

FIG. 1, and, to some extent, FIG. 2 illustrate coupling structures for effecting mating of two or more of the vehicles 26 together. This would be intended to be done if, for example, parents were traveling with two or more children. One of the parents would sit in the left seat of the lead vehicle so that, during roadway mode operations, vehicle control functions and steering could be governed by the parent. The other parent and/or children could be in the second, towed vehicle.

Any number of types of coupler could be employed. It is envisioned, however, that a particular structure illustrated in FIG. 1 would serve this function particularly well. That structure includes a front coupling 60 which is biased to a recessed position within the front of the vehicle 26. An extension actuator 62 is received behind the coupling 60, the extension actuator 62 being capable of being extended by, for example, solenoid means. A release mechanism includes an arm 64 which, as the coupling 60 is urged forward, would be captured by an eye 66 extending upwardly from the coupling 60. With the coupling 60 extended, it could be captured by a rear coupling 68 in the intended lead vehicle. Locking of the couplings 60, 68 in a mated configuration could be maintained until release is desired at some later time. A solenoid 70 can be provided to release the arm 64 captured by the eye 66 of the coupling 60 upon actuation of the armature 72 of the solenoid 70. With the rear coupling 68 of the lead vehicle then releasing, the front coupling 60 of the second vehicle would snap back, under the influence of an appropriate bias means (not shown), to its normal, retracted position.

An engagement switch 74 can be provided to initiate operation of the extension actuator mechanism 62. The engagement switch 74 can take the form of a proximity sensor. The determination that the towed vehicle is in close proximity to the lead vehicle would, thereby, initiate operation of the coupling sequence.

Finally, FIGS. 1 and 2 illustrate a traction drive mechanism 76 which is seen, in FIG. 1, in its retracted, upper, or stowed position. This is the position it assumes during roadway operations. The traction drive mechanism 76 includes a stem 78 which is pivoted, at its first end, to the axle 80 with respect to which the front motive wheels 46 rotate. The stem 78 mounts, proximate its second end, the traction drive wheel 82 which effects movement of the vehicle 26 along the guideway branches. A pair of stops are shown, the stops 84, 86 limiting the arc of pivot of the stem 78. The stem 78 assembly carries a paddle 88 which engages one or the other of the stops 84, 86 as the stem 78 is made to pivot about the axle 80. It will be understood that the stops are located in defined circumferential positions with regard to the axle 80, and the paddle 88 revolves about the axle 80 as the stem 78 is made to pivot. The paddle 88 engages the upper stop 84 when the stem 78 is in a retracted, upper disposition, and the paddle 88 engages the lower stop 86 when the stem 78 is pivoted downwardly so that the traction drive wheel 82 is in its guideway operating position.

FIG. 1 illustrates a cylinder 90 mounted at one end at a fixed location within the vehicle 26. A ram 92 extends from the other end of the cylinder 90, through a guide 94, and it pivotally attached to the stem assembly at a location therealong spaced from the axis of pivoting. A moment arm is, thereby, defined. In viewing FIG. 1, therefore, one will understand that, when the ram 92 is retracted, the traction drive wheel 82 will be in its retracted stowed position. This will be true in the case of roadway mode operations. When the ram 92 is extended, the traction drive wheel 82 will be extended. This will be true in guideway mode operations.

Figure 3:
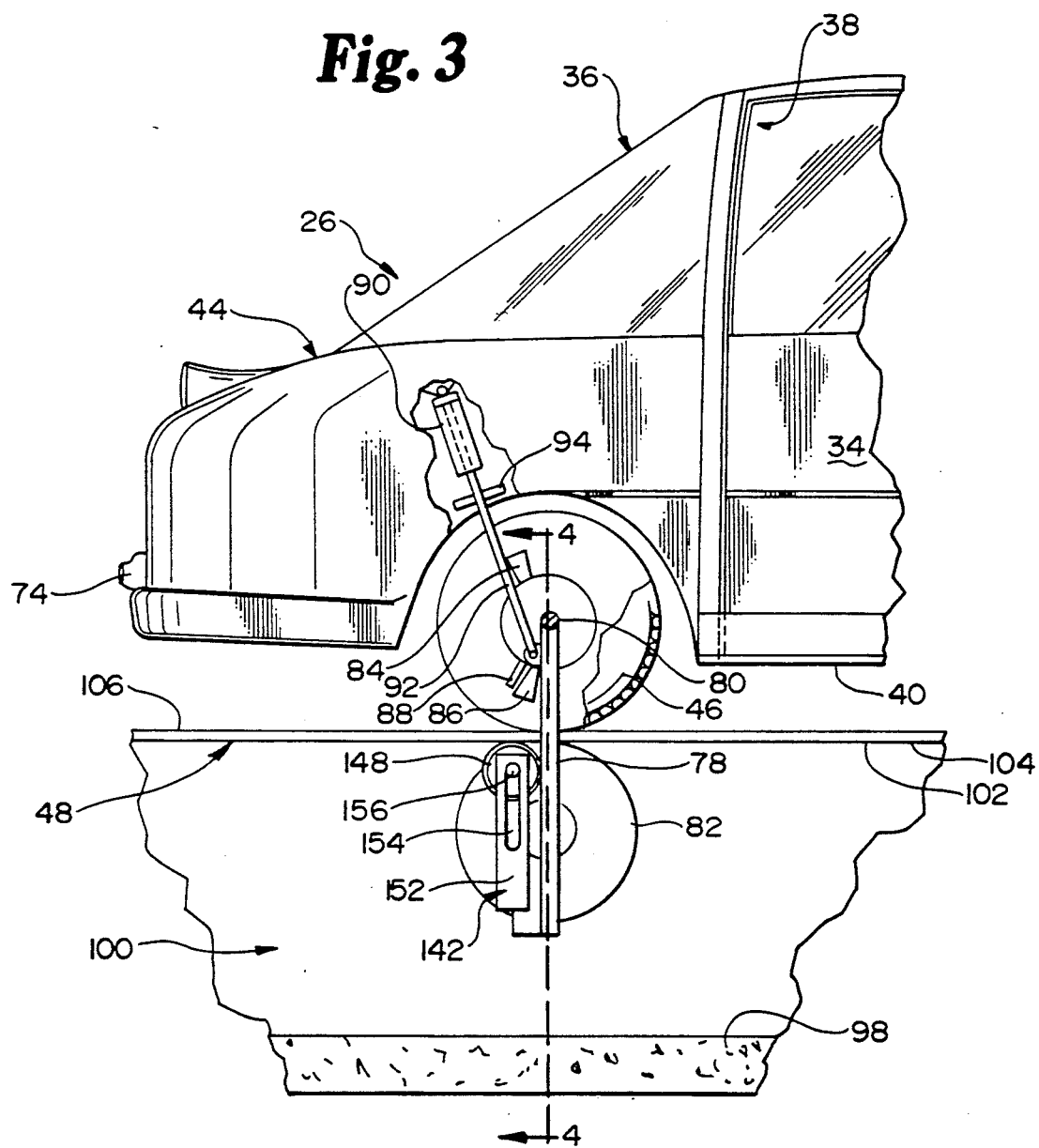
FIG. 3 is a simplified fragmentary left-side elevational view of the vehicle of FIG. 1 as configured for guideway mode operations.
Figure 4:
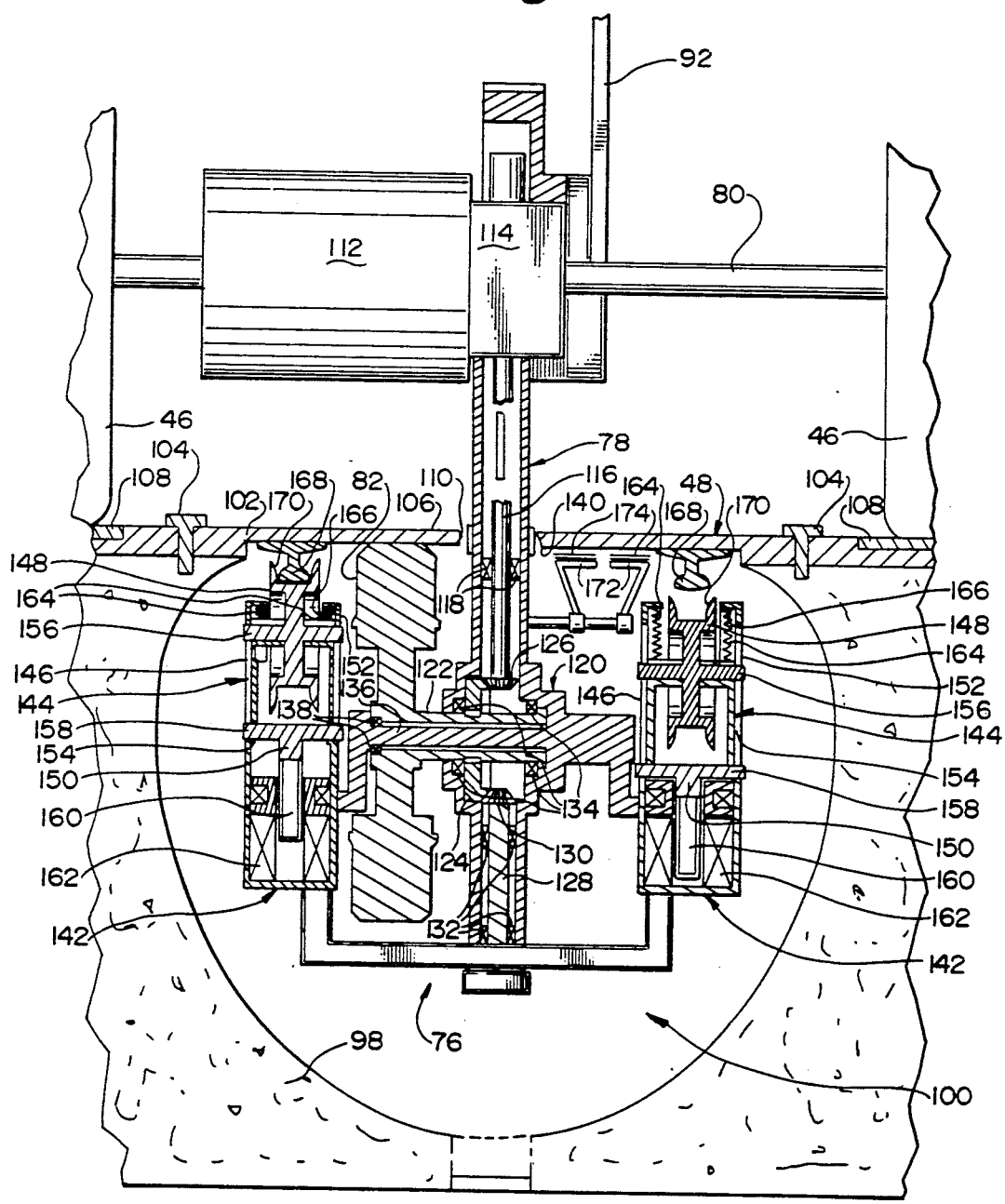
FIG. 4 is a simplified fragmentary sectional view taken generally along line 4—4 of FIG. 3.

Description of the traction/guidance system will now be given with reference to FIGS. 3–7 and 11. FIGS. 3–4 and 11 illustrate a vehicle 26 having already passed onto a traverse portion of a guideway branch 24. In FIG. 11, the guideway branch 24 is illustrated as being elevated with respect to the ground level, and a plurality of pillars 96, one of which is shown in FIG. 11, support a concrete form 98 which defines a tunnel 100 therewithin. It will be understood, however, that guideway branch 24 can be at ground level.

A guideway plate 102 is shown as mounted atop the concrete form 98, the plate 102 being secured in place by appropriate fasteners 104. The upwardly facing surface 106 of the guideway structure secured to the concrete form 98 is shown as accommodating a pair of wear surfaces 108. These surfaces 108 are spaced from a central slot 110 in the guideway at substantially equal distances.

As is best seen in FIG. 4, the stem 78 of the traction/guidance assembly is disposed generally centrally along the forward axle 80 of the vehicle 26, the front motive wheels 46 being substantially equidistant from the stem 78. When the stem 78 is received in the slot 110, the motive wheels 46 are, therefore, substantially equidistant from the slot 110. It is these distances which determine the location of the wear surfaces 108. The wear surfaces 108 are intended to absorb abrasive effects caused by the motive wheels 46. The wear surfaces 108 are contemplated as being replaceable so that, as excessive wear occurs on these surfaces, they can be removed and replaced with new surfaces.

FIG. 4 shows the ram 92 extending from the stem rotation cylinder 90 in a position wherein the stem 78 has been urged downwardly. It is true in FIGS. 3, 4, and 11 that a transition has already been made from a roadway mode of operation to a guideway mode of operation. The transition process will be discussed hereinafter.

FIG. 4 shows an electric motor 112 mounted to a forward axle 80 of the vehicle 26. This motor 112 drives, during the roadway mode of operation, the motive wheels 46, and, during the guideway mode of operation, the traction drive wheel carried by the stem 78.

FIG. 4 also illustrates a transmission 114. Such a transmission 114 serves a conventional function.

The traction stem 78 is a hollow tube, along much of its length, which, during the guideway mode of operations, extends downwardly through the central slot 110 along the guideway 48. The hollow tube does not rotate about its axis of elongation. Rather, an internal drive shaft 116, supported by appropriate bearings 118 extends downwardly within the tube. An expanded bushing 120 accommodates a partial axle 122 which is disposed for rotation within the bushing 120. The partial axle 122 extends within the bushing 120 and, within said bushing 120, carries a ring gear 124 which is mated thereto. The ring gear 124, in turn, is in engagement with a drive shaft bevel gear 126. Rotation of the drive shaft 116, therefore, is translated into rotation of the partial axle 122 about an axis generally perpendicular to the axis with respect to which the drive shaft rotates 116. In this case, that rotation is translated from one about a generally vertically-extending axis to one about a generally horizontally-extending axis.

A slaved shaft 128, coaxial with the drive shaft 116, is received within the stem tube proximate its lower end. This shaft 128 has, at its upper end, a bevel gear 130 which engages the ring gear 124 at its lower edge. This shaft 128 is supported within the tube by appropriate bearings 132. This slaved shaft 128 functions as a balancing idler to balance the torque imposed upon the partial axle 122.

The partial axle 122 is supported, within the bushing 120, by appropriate bearings 134. Similarly, a fixed shaft 136 which runs internally through the partial axle 122, supports the partial axle 122 by bearings 138.

The length of the stem 78, the location of the bushing 120, the diameter of the traction drive wheel 82, and the degree to which the stem assembly is pivoted downwardly, are functions of the intended position of the traction drive wheel 82 once in its guideway operating position. Since the traction drive wheel 82, through rotation imparted by the electric motor 112 and the drive shaft 116 is intended to impart movement to the vehicle 26 along the guideway 48, the outer surface of the traction drive wheel 82 must be in engagement with the undersurface 140 of the guideway plate 102. Both the outer periphery of the traction drive wheel 82 and the portion of the undersurface 140 of the guideway plate 102 will, accordingly, be frictional in nature. As a result, there will be little slippage between the traction drive wheel 82 and the guideway plate 102, and a large percentage of the rotational movement of the drive wheel 82 will be converted to linear movement along the guideway 48.

FIG. 4 illustrates the stem 78 as carrying, at distal ends of appendages 142 to the stem assembly, a pair of shieve assemblies 144. The assembly housings 146 are fixed relative to the stem 78, although the shieves 148 themselves are mounted on extensible members 150 a will be discussed hereinafter.

The operation of the shieve assembly 144 within its respective housing 146 will now be described with reference to FIGS. 5-7. Each housing 146 is defined by a pair of lateral walls 152. Each lateral wall 152 has formed therein a slot 154 which, when the traction/guidance system is in its position for guideway operations, extends generally vertically. A pin 156 about which the shieve 148 rotates is fitted into these slots 154. The axis about which the shieve 148 rotates, therefore, is able to be reciprocated along a portion of the length of the slots 154. A second pin 158 rigidly mated to the pin 156 with respect to which the shieve 148 rotates, also extends through the slots 154 at a location downwardly from the first pin 156. This second pin 158 is mounted at the upper end of an armature 160 received between windings 162 of a solenoid-type actuator. As will be able to be seen then, upward extension of the shieve 148 can be accomplished by inducing current flow through the windings 162 in a desired direction.

In view of the fact that the normal position of the shieve 148 is one near the bottom of its reciprocable path, gravity tends to bias the shieve 148 to its normal position. The figures, however, illustrate employment of spring means 164 which engage the upper pin 156 housing to urge the shieve downwardly. The upper ends of the springs 164 are engaged by shoulders 166 defined by an upper wall of the housing 146. FIG. 6 illustrates the armature 160 and shieve 148 extended against the bias of the springs 164, and the springs 164 are, thereby, compressed. The same is true in the case of FIG. 5, while, in FIG. 7, the shieve 148 is in its normal, retracted, downward position.

As illustrated in FIG. 4, two such shieve assemblies 144 are provided. FIG. 4 illustrates the shieves 148 as being spaced laterally on opposite sides of the stem tube. That figure also shows a pair of rails 168 being secured to the underside 140 of th guideway plate 102 at locations vertically aligned with corresponding shieves 148. When a shieve 148 is in its normal, downward retracted position, there is vertical spacing of the upper extremities of the shieve 148 and the lower extremity of its corresponding rail 168. Consequently, there is no "capture" of the rail 168 within an annular recess 170 formed in the outer peripheral surface of the shieve 148. This is the relationship illustrated with regard to the rightmost shieve housing assembly 144 in FIG. 4.

When the armature 160 and shieve carriage are extended, however, a rail 168 becomes captured within an annular recess 170 formed within an outer peripheral surface of the shieve 148. This relationship is illustrated with regard to the leftmost shieve housing assembly in FIG. 4.

FIG. 4 additionally illustrates a pair of collectors 172 extending upwardly into engagement with corresponding lines 174 secured to and running along the underside 140 of the guideway plate 102. These lines 174 transmit power and communications information, respectively, to the vehicle 26, and the collectors 172 serve to receive these inputs and provide them to the appropriate portions of the vehicle 26 needing such inputs. For example, power received through the power line is directed by the power collector to the electric motor 112 to drive the motor 112 during guideway mode operations. Additionally, such power is received by the power collector and transmitted to a battery or batteries (not shown) which provide power to the motive wheels 46 during roadway mode operations.

FIG. 12 illustrates a preferred shieve housing assembly construction. The basic structure illustrated therein is the same as that illustrated in FIG. 6. In the FIG. 12 embodiment, however, the pin 156 on which the shieve 148 turns is hollow, an interior chamber 176 formed therein being in fluid communication with a reservoir 178 of fluid under pressure. The reservoir 178 holds a fluid which, it is intended, will lubricate the surface of the shieve 148 defining the annular recess 170, and the rail 168. The shieve 148 illustrated in the embodiment is provided with one or more radially extending passages 180, each passage 180 becoming registered with a port 182 in the pin 156 at the same time the radially-outward end of the passage 180 is proximate the rail 168 during the rotation of the shieve 148. The radially outward end of each passage 180 is provided with a ball-type check valve 184, the ball 186 of the valve 184 being biased radially outwardly to a point where a portion extends outwardly from the peripheral surface of the shieve recess 170 bottom. At the same time, however, the ball 186 is prevented by that surface from escaping outwardly. Bias can be accomplished by any appropriate means such as coil spring 188. Since the inner end of the passage 180 becomes registered with the port 182 in the pin 156 when the outer end of the passage 180 is proximate the rail 168, fluid within the chamber 76 within the pin 156 will be allowed to flow into the passage 180 and through the check valve 184 at the same time. Since the fluid is under pressure, each time the check valve 184 is opened, an amount of lubricating fluid will be metered through the valve 184.

Operation

Operation of the present system will be now described, the disposition of a vehicle 26 initially being assumed to be for roadway mode operations. The traction/guidance system assembly will be in a stowed disposition such as illustrated in FIG. 1. It will be remembered that, in this mode, the left passenger controls operation of the vehicle 26 by means of various controls in the tiller handle (not shown) to effect acceleration, braking, horn, and turn signals, and by maneuvering of the tiller 56 itself to maintain the vehicle 26 on a roadway. Typically, such operation might be to travel from a residence to the nearest station having entry ramps to the guideway system.

It will be understood that, for the most part, vehicles 26 would be owned by a transit authority, and a vehicle 26 might be rented for off-guideway use. It is anticipated, however, that it would be possible for individuals or companies to buy one or more vehicles for private use. Economy might be achieved through private ownership because of cost savings obtained by not having to pay for roadway rental and by obtaining a discount for guideway usage. If private ownership were involved, parking at both point of departure and point of destination would have to be individually arranged. It is true, of course, if the vehicle 26 is rented, parking would not be any problem since the vehicle would be parked automatically at a destination station.

In either case, however, once obtaining a vehicle 26 and driving it to the nearest station, the vehicle would be driven onto the first available entry ramp 22. As best seen in FIG. 9, the entry ramp portion 22 of the guideway 48 is provided with a cleft 190 which narrows from a relatively wide dimension at the beginning end of the ramp to a relative narrow dimension at the terminal end of ramp. The cleft 190 at the terminal end of the ramp is in registration with the slot 110 in the traverse portion of the guideway 48.

As the passenger maneuvers the vehicle 26 onto the entry ramp, action is initiated to begin lowering of the traction drive wheel carrying stem 78. As will be remembered, carrying stem 78 mounts both traction drive wheel 82 and shieve assemblies 144. As the vehicle 26 is driven so that motive wheels 46 are positioned on ramp plates 194, the stem 78 and its carried appendages becomes positioned above a void 192. The void 192 is provided so that, as the stem 78 is lowered, damage will not be occasioned to any of the components.

The stem 78 will be pivoted downwardly to a position wherein all components carried thereby are disposed below the undersurface of the guideway plate 102. The vehicle 26 will not, necessarily, be automatically centered with respect to the guideway at this time. As one will understand, while the operator of the vehicle 26 will make every attempt to appropriately dispose the vehicle 26 as centered as possible, it is virtually impossible to achieve completely accurate centering by "seaman's eye". With the stem 78 lowered, however, the vehicle 26 will be maneuvered forward on the ramp, and the stem will engage one of the surfaces defining cleft 190. Because of the sloping angle of this surface, there will be a tendency to urge the vehicle 26 to a centered position. Such centering will be facilitated by centering rollers 27. These rollers 27 are disposed for rotation about their axes which are intended to be aligned with the axis of elongation of slot 110. Rollers 27 are disposed for free rotation, and, therefore, as the stem 78 engages one of the sloping surfaces of cleft 190, movement of the vehicle 26 so that stem 78 moves laterally toward alignment with slot 110 is facilitated. Eventually, the vehicle 26 will achieve a longitudinal position at which stem 78 is received within slot 110. By the time this longitudinal positioning is achieved, the vehicle 26 will, of course, have been laterally directed so that stem 78 is received within slot 110.

At this point, stem 78 can be pivoted upwardly by retraction of ram 192 within cylinder 90 until traction drive wheel 82 comes into engagement with the undersurface of guideway plate 102 and shieve assemblies 144 are in position relative to their corresponding rails 168 so that guidance of the vehicle 26 can be automatically accomplished in response to commands initiated by the on-board computer in a manner as discussed in this document.

When the vehicle 26 has achieved this relationship with respect to the guideway 48, the vehicle's operator can effect the transition from the roadway mode of operation to the guideway mode of operation. The computer of the vehicle 26 will be programmed so that solenoid actuation of appropriate shieves 148 will be effected at appropriate guideway branch intersections. This will be accomplished after contact is made between collectors 172 and corresponding lines 174 after stem 78 has been pivoted upwardly. For example, computer operation and control will be such that, as the vehicle travels toward a fork at which the left branch is desired to be taken, the shieve configuration illustrated in FIGS. 4 and 11 will be implemented. As a result, the left shieve will capture, within the recess 170 formed in its outer surface, the left track. The right track will remain uncaptured, and the vehicle 26 will be free to be drawn onto the left fork branch. As this occurs, the stem 78 will pass into the slot 110 into the left fork branch guideway portion, and the right shieve will become vertically aligned with a right rail on the left branch portion of the guideway. Such operations will automatically transfer the vehicle 26 to its ultimate destination.

When a station is arrived at, a vehicle is directed to one of a plurality of available exit ramps 28. While in switching from roadway mode of operation to guideway mode of operation, the traction drive wheel stem 78 is lowered, the operator of the vehicle, after switching modes, will raise the stem 78 as the vehicle proceeds along the exit ramp 28. As seen in FIG. 10, exit ramps 28 are provided with voids 196, and, as a vehicle 26 proceeds over such a void 196, slot 110 has widened so that motive wheels 46 are merely on plates 198. This affords ample room for stem 78 and its appendages to be pivoted upwardly so that the traction drive wheel 82 and shieve assemblies 144 carried by the stem 78 are able to be tucked into position within the body 44 of the vehicle 26 for roadway mode operations. Utility power is cut off, and the vehicle 26 switches to battery power for street operations. Proceeding off the ramp will be under roadway mode conditions, and the stem 78 will have been pivoted upwardly as discussed above. Vehicle 26 will proceed once the stem 78 has been completely raised.

Numerous characteristics and advantages of the invention have been set forth in the foregoing description. It will be understood, however, that this disclosure is, in many respects, only illustrative. Other embodiments for certain features of the invention are specifically contemplated. For example, rather than having friction surfaces at the interface between the traction drive wheel 82 and the undersurface 140 of the guideway plate 102, a rack-and-pinion structure could be employed. Similarly, other variations could also be incorporated without exceeding the scope of the invention. The invention's scope is, of course, defined in the language in which the appended claims are expressed.

What is claimed is:

1. A transit system, comprising:
   (a) a guideway having:

(i) a traverse portion having a longitudinally-extending slot formed generally centrally therewithin; and
(ii) an entry ramp having a cleft narrowing from a beginning end of said entry ramp into said slot at a terminal end of said entry ramp; and
(b) a vehicle including:
(i) a chassis;
(ii) a plurality of motive wheels carried by said chassis;
(iii) a traction drive wheel carried by said chassis and disposed for movement between a retracted position above a plane defined by lower extremities of said motive wheels and an extended position wherein, when said vehicle is seated on said traverse portion of said guideway with said motive wheels in engagement with an upper surface thereof, said traction drive wheel is in engagement with a lower surface thereof;
(c) means for driving said motive wheels when said vehicle is off said guideway; and
(d) means for driving said traction drive wheel when said vehicle is on said guideway.

2. The system in accordance with claim 1 further comprising a stem pivotally mounted, at a first end thereof, to said chassis, said stem mounting, at a second end thereof, said traction drive wheel.

3. The system in accordance with claim 2 wherein said lower surface of said traverse portion of said guideway has a pair of longitudinally running rails extending therefrom, said system further comprising a pair of shieves carried by said stem, each at a defined lateral distance therefrom so that, when said stem is received within said slot, said shieves receivable in corresponding rails within annular recesses formed in outer surfaces of said shieves.

4. The system in accordance with claim 3 further comprising means for lubricating an interface between each of said shieves and a corresponding rail.

5. The system in accordance with claim 4 wherein a generally radially-extending passage is formed in each of said shieves, an inner end of each of said passages communicating with a pressurized source of lubricating fluid and an outer end of each of said passages being provided with a check valve, wherein, as each of said check valves engages its corresponding rail as said shieves rotate, a metered amount of fluid is released through said check valves.

6. The system in accordance with claim 1 wherein said means for driving said motive wheels and said means for driving said traction drive wheel comprise a common electric motor 7. The system in accordance with claim 1 wherein said vehicle defines a passenger compartment therewithin, said compartment provided with at least one desk work surface.

8. The system in accordance with claim 1 further comprising means for coupling a plurality of vehicles together.

9. The system in accordance with claim 8 wherein said ganging means comprises coupling means is located at a front and a rear of each of a plurality of vehicles, the coupling means at the front of one vehicle being compatible with the coupling means at the rear of another vehicle, wherein two or more of said vehicles can be mated together in series.

10. The system in accordance with claim 1 wherein said traverse portion of said guideway comprises multiple branches, each of said branches diverging from another branch at an intersection therewith, said system further comprising:
(a) computer control means for generating signals to instruct said vehicle as to which branch, diverging from an intersection of a plurality of said branches, to follow; and
(b) mechanical means, responsive to signals generated by said computer control means, for implementing the following of a particular designated branch.

11. The system in accordance with claim 10 wherein a lower surface of each branch of said traverse portion of said guideway has a pair of longitudinally running rails extending therefrom, each of said rails being spaced laterally from a longitudinally-extending slot formed centrally within a respective branch at substantially the same distance as the other of said rails, said mechanical means comprising:
(a) a pair of shieves carried by said stem at a location so that, when said vehicle is on said guideway, an annular recess formed in an outer surface of each of said shieves receivable within a corresponding rail of a branch of said traverse portion of said guideway.

12. The system in accordance with claim 11 wherein each of said shieves is carried by said stem so as to enable selective vertical reciprocation thereof, wherein a desired one of said shieves can be moved vertically upwardly to a position wherein the annular recess formed in the outer surface thereof receives therewithin its corresponding rail.

13. A light transit system employing multiple modes of transport, comprising:
(a) a guideway having a plurality of intersecting branches, each branch having a longitudinally-extending slot formed generally centrally therewithin and, on an underside thereof, a pair of longitudinally-running rails, each of said rails being spaced from said slot, on opposite sides thereof, at substantially the same distance;
(b) a vehicle having a chassis and a plurality of motive wheels extending downwardly from said chassis;
(c) a stem pivotally mounted, at a first end thereof, to said chassis;
(d) a traction drive wheel carried by said stem at a second end thereof, said traction drive wheel having an outer peripheral friction surface;
(e) a cooperating friction surface defined in said underside of a branch of said guideway, said friction surface defined in said underside of said branch of said guideway being disposed so that, when said stem is received within said slot with said traction drive wheel beneath said branch of said guideway, said stem can be pivoted upwardly so that said friction surface of said traction drive wheel engages said friction surface defined within said underside of said branch of said guideway; and
(f) common means for driving said motive wheels, during a roadway mode of operation, and said traction drive wheel during a guideway mode of operation.

14. The system in accordance with claim 13 further comprising means for enabling mounting of said guideway in order to transition between a roadway mode of operation and a guideway mode of operation.

15. The system in accordance with claim 14 further comprising computer control means for automatically selecting and effecting transfer from one branch of said guideway to another.

* * * * *